United States Patent
Wakisaka et al.

[11] Patent Number: 6,068,092
[45] Date of Patent: *May 30, 2000

[54] BRAKE BAND

[75] Inventors: Toshiaki Wakisaka; Yoshihisa Harada, both of Fukuroi, Japan

[73] Assignee: NSK-Warner K.K., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/604,014

[22] Filed: Feb. 20, 1996

[30] Foreign Application Priority Data

Feb. 21, 1995 [JP] Japan .................................. 7-032522

[51] Int. Cl.[7] ...................................................... F16D 51/00
[52] U.S. Cl. .......................................................... 188/74 R
[58] Field of Search ............................... 188/77 R, 77 W, 188/74, 58, 26

[56] References Cited

U.S. PATENT DOCUMENTS

| 4,891,959 | 1/1990 | Wood | 188/77 R |
| 5,016,521 | 5/1991 | Haka | 188/77 R |
| 5,018,434 | 5/1991 | Haka | 188/77 R |
| 5,131,509 | 7/1992 | Moon | 188/77 R |

*Primary Examiner*—Robert J. Oberleitner
*Assistant Examiner*—C. T. Bartz
*Attorney, Agent, or Firm*—Vorys, Sater, Seymour and Pease LLP

[57] ABSTRACT

In a brake band mounted on a transmission for a vehicle which is provided with a strap having opposite end portions and twined around the outer periphery of a drum, an apply side end portion provided on one end portion of the strap, and an anchor side end portion provided on the other end portion of the strap, at least one of the apply side and anchor side end portion of the brake band is supported or fixed so as to have a predetermined gap with respect to the outer peripheral surface of the drum during non-tightening of the brake band.

33 Claims, 3 Drawing Sheets

BRAKE BAND

BACKGROUND OF THE INVENTION

1. Field of the Invention

This invention relates to a brake band for use in a transmission for a vehicle such as an automobile, an agricultural machine or a construction machine, and particularly for use in an automatic transmission. More particularly, it relates to a brake band capable of floating the opposite end portions of a strap twined around a drum by a predetermined amount from the surface of the drum to thereby prevent any sudden torque fluctuation during the tightening of the brake band.

2. Related Background Art

In an automatic transmission, a multiplate clutch, a brake band or the like is used to effect speed change with an input element such as a gear train fixed and liberated. Of these, the brake band is widely used because it has the characteristic that its braking force differs depending on the braking direction of a drum even when the same acting force is applied and it has the preferred characteristic of smoothening upshift.

The construction of a brake band according to the prior art has been as follows.

The strap of the brake band is wound on a drum and brackets are provided on the opposite end portions thereof. An anchor pin and an apply pin are slidably or swingably supported on each bracket. Also, the end portions of the strap on which the brackets are provided are in light contact with the outer peripheral surface of the drum during the non-operation of the brake band (during the non-tightening when a tightening force is not applied to the drum).

In such a construction, the operational force of the apply pin urges the strap having a lining attached to its back against the outer peripheral surface of the rotating drum through the bracket. Thereupon, a frictional force created is transmitted as strap tension to the anchor pin through the bracket on the anchor side. The frictional force transmitted to the anchor pin is received by the case of the automatic transmission and appears as a torque. When a great torque is suddenly transmitted, a great speed change shock will occur. For example, when the brake band is incorporated in an automatic transmission used in a vehicle such as an automobile, this speed change shock becomes great enough to be bodily sensed and thus, gives an unpleasant feeling to the crew.

The problem of the speed change shock by the sudden transmission of a great torque arises from the fact that during a low load, the brake band has a greater torque capacity than necessary. The present invention has been made in view of the problem as noted above.

SUMMARY OF THE INVENTION

Accordingly, it is the object of present invention to provide a brake band for an automatic transmission which improves the shock absorbing effect during the tightening of the brake band by a simple construction to thereby reduce a speed change shock.

To achieve the above object, the brake band of the present invention is a brake band mounted in a transmission for a vehicle which is provided with:

a strap having opposite end portions and twined around the outer peripheral surface of a drum;

an apply side end portion provided on one end portion of said strap; and an anchor side end portion provided on the other end portion of said strap;

and is characterized in that during the operation of said brake band, at least one of the apply side end portion and the anchor side end portion of said brake band is supported or fixed so as to have a predetermined gap with respect to the outer peripheral surface of said drum.

Because of a construction in which, as described above, during the operation of the brake band, at least one of the apply side end portion and the anchor side end portion of the brake band is supported or fixed so as to have a predetermined gap with respect to the outer peripheral surface of the drum, the shock absorbing action during the tightening of the brake band increases and a speed change shock can be reduced.

DESCRIPTION OF THE PREFERRED EMBODIMENT

Figure 1:
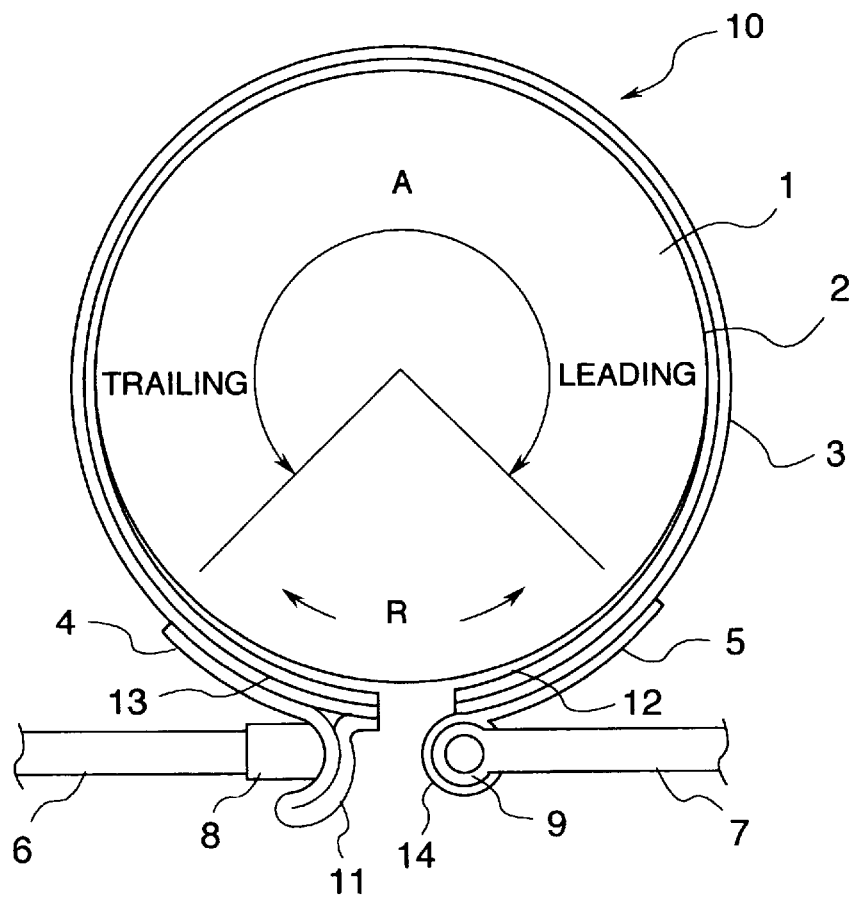
FIG. 1 shows an embodiment of a structure of the brake band according to the present invention.

A brake band according to the present invention will hereinafter be described in detail with reference to the accompanying drawings. In the drawings, like portions are given like reference numerals.

FIG. 1 is a view of the brake band according to the present invention as it is seen from the direction of a rotary shaft. The brake band 10 is wound on the outer peripheral surface of a rotatable member, i.e., a drum 1, so as to extend around substantially the entire outer peripheral surface of the drum 1.

The brake band 10 comprises a curved band-like strap 3 of steel having a predetermined axial width and a predetermined radial thickness and having opposite end portions, an apply side bracket 4 (an acting point side to which an acting force is applied) fixed to one end portion of the strap 3, an anchor side bracket 5 (a fulcrum side receiving the acting force) fixed to the other end portion of the strap 3, and a porous frictional material (lining) 2 of substantially the same shape as the strap 3 adhesively secured to the back side of the strap 3 and frictionally sliding with respect to the outer peripheral surface of the drum 1.

The end portion of the apply side bracket 4 is a bend portion 11, and the tip end portion 8 of an apply pin 6 abuts against this bend portion 11 and gives an acting force to the brake band 10 through the bracket 4.

The end portion 9 of an anchor pin 7 is pivotally mounted on the end portion 14 of the anchor side bracket 5. With the end portion 9 of this anchor pin 7 as a fulcrum, the acting force by the apply pin 6 is given to the brake band 10.

In FIG. 1, with respect to the direction of rotation R of the drum 1, the apply side (clockwise direction) is the trailing side and the anchor side (counter-clockwise direction) is the leading side. The strap 3 is wound on the outer peripheral surface of the drum 1 at an angle of twine A.

Figure 2:
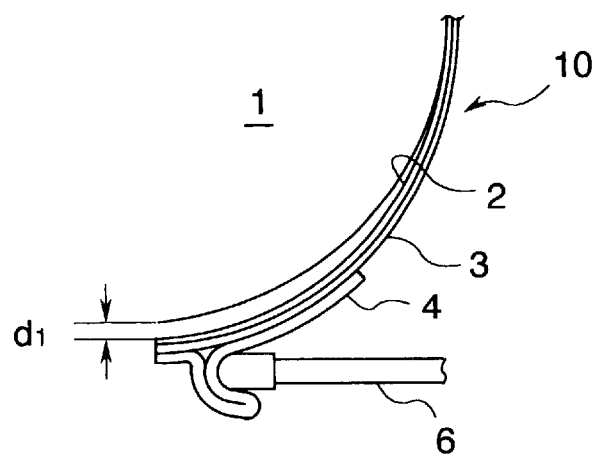
FIG. 2 is a fragmentary front view showing the apply side end portion of the brake band of FIG. 1 with a gap $d_1$.
Figure 3:
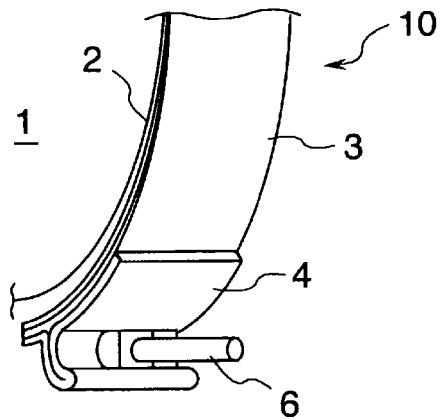
FIG. 3 is a fragmentary perspective view corresponding to FIG. 2 and showing the apply side end portion of the brake band of FIG. 1.

FIGS. 2 and 3 are a fragmentary front view and a fragmentary perspective view, respectively, showing the relationship of the apply pin 6, the bracket 4 and the outer peripheral surface of the drum 1. These figures show the state before the operation of the brake band 10. As is apparent from FIGS. 2 and 3, particularly FIG. 2, a gap $d_1$, is defined between the outer peripheral surface of the drum 1 and the frictional material 2 attached to the strap 3 of the brake band 10.

Figure 4:
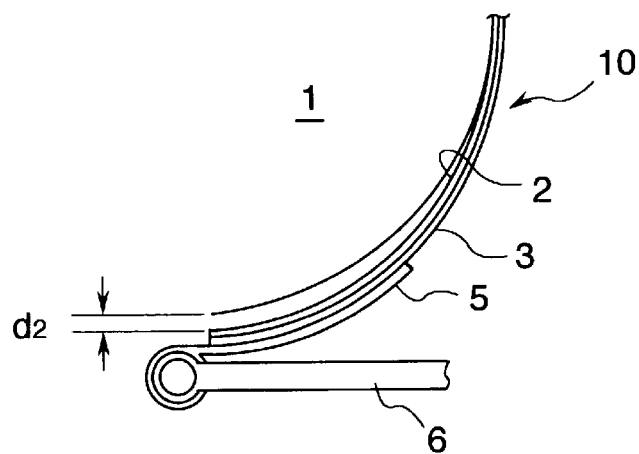
FIG. 4 is a fragmentary front view showing the anchor side end portion of the brake band of FIG. 1 with a gap $d_2$.
Figure 5:
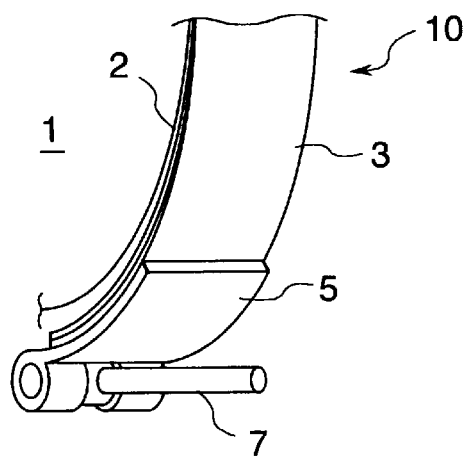
FIG. 5 is a fragmentary perspective view corresponding to FIG. 4 and showing the anchor side end portion of the brake band of FIG. 1.

FIGS. 4 and 5 are a fragmentary front view and a fragmentary perspective view, respectively, showing the relationship of the anchor pin 7, the bracket 5 and the outer peripheral surface of the drum 1. These figures show the state before the operation of the brake band 10. As is apparent from FIGS. 4 and 5, particularly FIG. 4, a gap $d_2$ is defined between the outer peripheral surface of the drum 1 and the frictional material 2 attached to the strap 3 of the brake band 10.

As is apparent from the above-described construction, the end portions of brake band 10 on both of the apply side and the anchor side of the brake band 10 with respect to the outer peripheral surface of the drum 1 are supported or fixed so as to have the predetermined gaps. As shown in FIGS. 2 and 4, it is preferable that the gaps $d_1$, and $d_2$ have their maximum sizes on the opposite end portions of the brake band 10 and be of the order of 1 mm to 2 mm, and the sizes of those gaps decrease inwardly from the opposite end portions. The gaps $d_1$ and $d_2$ become null at a point whereat they come inwardly by a predetermined distance, and at that point, the frictional material 2 of the strap 3 is in contact with the outer peripheral surface of the drum 1. In the areas other than the end portions having the gaps $d_1$ and $d_2$, the brake band 10 is in contact with the outer peripheral surface of the drum 1 over the entire area thereof.

The function provided by providing the gaps $d_1$ and $d_2$ will now be described. As previously described, when the brake band 10 begins to operate, the operational force of the apply pin 6 urges the frictional material 2 against the outer peripheral surface of the drum 1 through the bracket 4. At this time, a frictional force created is transmitted as the tension of the strap 3 to the anchor pin 7 through the anchor side bracket 5 and is received by a case, not shown, to which the anchor pin 7 is fixed.

When this force transmitted to the anchor pin 7 appears as a frictional torque and a great torque is suddenly transmitted, a speed change shock becomes great and poses a problem. The present invention, however, is of a construction in which the opposite end portions of the brake band 10 are supported with a sufficient gap formed during non-operation and therefore, during the operation of the brake band 10, when tension of the strap 3 is transmitted to the anchor pin 7, the anchor pin 7 and the bracket 5 tend to deform so as to narrow the gap $d_2$. The force required for this deformation is consumed as a part of the force transmitted to the anchor pin 7, and has the effect of displaying a shock absorbing effect, hampering the sudden transmission of the force and alleviating the speed change shock.

Also, the gaps are provided in advance in the opposite end portions of the brake band 10, that is, the brake band is supported so that the end portions thereof may float, and therefore the angle of twine A at which the brake band 10 operates relative to the drum 1 decreases and the torque capacity falls. When the operational force of the brake band 10 is applied, the anchor pin 7 and the bracket 5 are deformed as described above and in conformity with the magnitude of the load, the gap decreases and the angle of twine A increases. As a result, the torque capacity rises and approximates to a regular capacity. That is, design is made such that during a low load, the torque capacity does not become unnecessarily great.

Generally, the problem of a speed change shock is that during a low load, the band has a greater torque capacity than necessary. The present invention, makes the angle of twine A small during a low load and makes the angle of twine A great (approximating it to a normal angle) during a high load whereby it becomes possible to reduce the torque capacity during the low load without causing a reduction in the torque capacity during the high load.

Also, the aforementioned gaps and the distances from the end portions on the apply side and the anchor side to the point of contact with the outer peripheral surface of the drum 1 can be changed in conformity with the frictional torque characteristic. Further, in the present embodiment, the sizes of the gaps $d_1$ and $d_2$ are substantially equal to each other, but alternatively may differ from each other.

Figure 6:
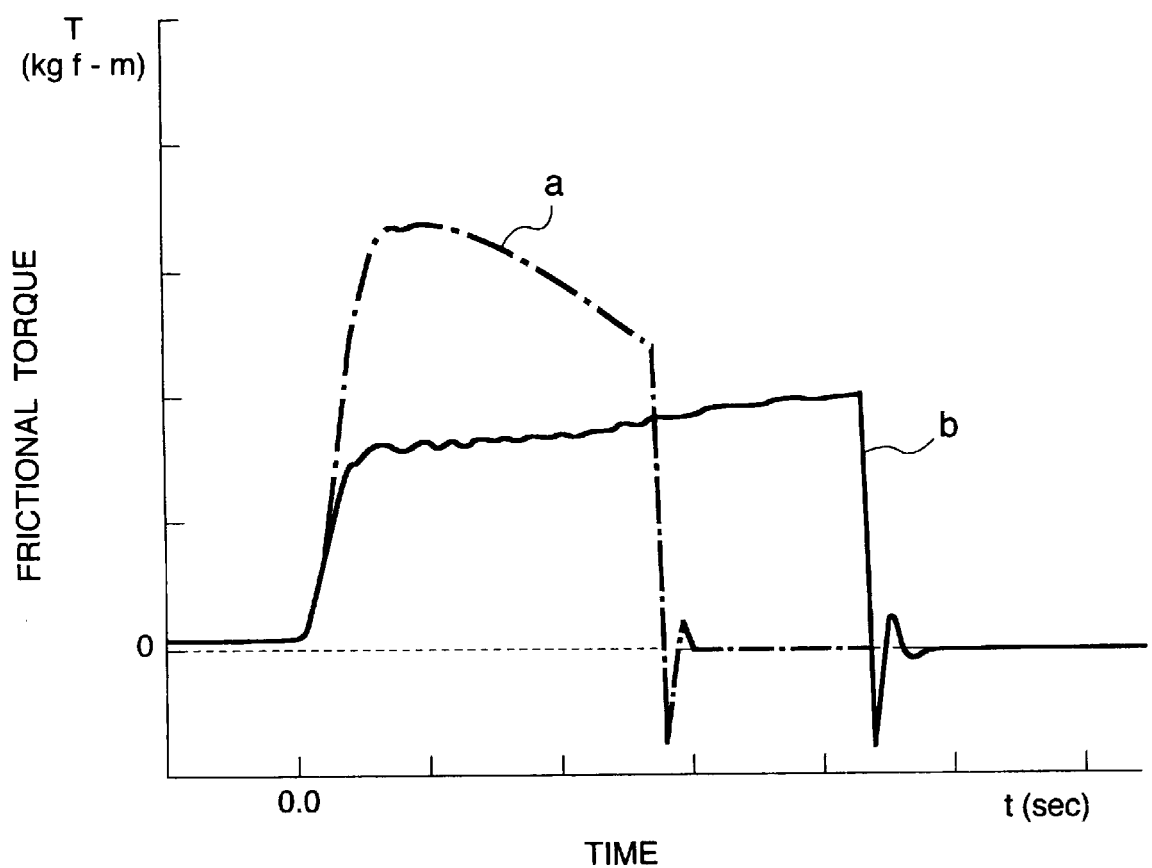
FIG. 6 is a graph showing the comparison between the frictional characteristics of a brake band according to the prior art and a brake band according to the present invention.

This will hereinafter be described with reference to FIG. 6. FIG. 6 is a graph showing the comparison between the frictional characteristics of the brake band according to the prior art and the brake band according to the present invention during the operation, i.e., the braking. Both of the brake band according to the prior art indicated by a dot-and-dash line a and the brake band according to the present invention indicated by a solid line b immediately increase in the frictional torque after the start of the braking, and exhibit good torque characteristics.

However, in the brake band according to the prior art, the frictional torque suddenly rises after the start of the operation of the brake band and reaches a peak torque in a very short time. That is, the starting torque ($\mu$) during the operation, i.e., the tightening, of the brake band becomes considerably great. As is apparent from the dot-and-dash line a in FIG. 6, thereafter the frictional torque suddenly begins to decrease. This sudden decrease in the frictional torque, i.e., the difference between the peak torque of the output torque during a speed change and the output torque after the termination of the speed change appears as a great speed change shock and is bodily felt by the crew.

In contrast, according to the brake band of the present invention, as indicated by the solid line b, the magnitude of the starting torque during the tightening of the brake 10 is small as compared with that in the prior art. Accordingly, the speed change shock of the automatic transmission also becomes small. The peak of the frictional torque lasts for a predetermined time as indicated by the solid line b in FIG. 6 and therefore, the changes such as an increase and a decrease in the torque are not sudden as compared with the prior art, that is, deceleration takes place slowly and thus, the speed change shock can be reduced.

While in the above-described embodiment, the gap between the brake band 10 and the outer peripheral surface of the drum 1 is provided in the opposite end portions of the brake band 10, it need not always be provided in the opposite end portions but may be provided only in one end portion. In that case, the gap may preferably be provided in the anchor side end portion.

As described above, according to the brake band of the present invention, during the operation of the brake band, at least one of the apply side end portion and the anchor side end portion of the brake band is supported or fixed so as to have a predetermined gap with respect to the outer peripheral surface of the drum and therefore, the shock absorbing action during the tightening (the operation) of the brake band increases and also, a flat frictional characteristic is obtained from the initial stage of the tightening, and it becomes possible to reduce the shock during a speed change, and particularly the speed change shock in case of upshift.

What is claimed is:

1. A brake band mounted on a drum, said brake band comprising:

a strap having opposite end portions and twined around an outer peripheral surface of said drum;

an apply side end portion provided on one end portion of said strap; and an anchor side end portion provided on the other end portion of said strap, wherein, in an initial state of the brake band with no tightening force applied to the drum, a portion of said strap contacts said outer peripheral surface of said drum to define an initial twining angle and at least one of the apply side end portion and the anchor side end portion of said brake band is disposed so as to have a predetermined gap with respect to said outer peripheral surface of said drum, and, as a tightening force is applied increasingly to the apply side end portion, the twining angle gradually increases.

2. A brake band according to claim 1, wherein said gap is provided between said anchor side end portion and said outer peripheral surface of said drum.

3. A brake band according to claim 1, wherein said gap is provided between said apply side end portion and said outer peripheral surface of said drum and another gap is provided between said anchor side end portion and said outer peripheral surface of said drum.

4. A brake band according to claim 1, wherein brackets are provided on said apply side end portion and said anchor side end portion, respectively, an apply pin abuts against the bracket on said apply side end portion, and an anchor pin is fixed to the bracket on said anchor side end portion.

5. A brake band according to claim 2, wherein brackets are provided on said apply side end portion and said anchor side end portion, respectively, an apply pin abuts against the bracket on said apply side end portion, and an anchor pin is fixed to the bracket on said anchor side end portion.

6. A brake band according to claim 3, wherein brackets are provided on said apply side end portion and said anchor side end portion, respectively, an apply pin abuts against the bracket on said apply side end portion, and an anchor pin is fixed to the bracket on said anchor side end portion.

7. A brake band according to claim 1, wherein said gap is gradually reduced as the tightening force is applied increasingly to the apply side end portion.

8. A brake band according to claim 1, wherein said gap decreases in size along said strap with increasing distance from said one of the apply side end portion and the anchor side end portion.

9. A brake band according to claim 1, wherein said anchor side end portion includes an anchor pin.

10. A brake band according to claim 1, wherein said gap not larger than 2 mm.

11. A brake band according to claim 2, wherein said gap is not larger than 2 mm.

12. A brake band according to claim 3, wherein each of said gaps is not larger than 2 mm.

13. A brake band according to claim 4, wherein said gap is not larger than 2 mm.

14. A brake band according to claim 5, wherein said gap is not larger than 2 mm.

15. A brake band according to claim 6, wherein each of said gaps is not larger than 2 mm.

16. A brake band according to claim 7, wherein said gap is not larger than 2 mm.

17. A brake band according to claim 8, wherein said gap is not larger than 2 mm.

18. A brake band according to claim 1, wherein, as the tightening force is applied increasingly to said apply side end portion, a maximum distance of said gap is reduced.

19. A brake band mounted on a transmission for a vehicle, provided with:

a strap having opposite end portions and twined around an outer peripheral surface of a drum;

an apply side end portion provided on one end portion of said strap; and an anchor side end portion provided on the other end portion of said strap, wherein, in an initial state of the brake band with no tightening force applied to the drum portion, a portion of said strap contacts said outer peripheral surface of said drum to define an initial twining angle and at least one of the apply side end portion and the anchor side end portion of said brake band is disposed so as to have a predetermined gap with respect to said outer peripheral surface of said drum, and, as a tightening force is applied increasingly to the apply side end portion, the twining angle gradually increases.

20. A brake band mounted on transmission for a vehicle, said brake band comprising:

a strap having opposite end portions and twined around an outer peripheral surface of a drum;

an apply side end portion provided on one end portion of said strap; and an anchor side end portion provided on the other end portion of said strap, wherein, in an initial state of the brake band with no tightening force applied to the drum, a portion of said strap contacts said outer peripheral surface of said drum to define an initial twining angle and said anchor side end portion of said brake band is disposed so as to have a predetermined gap with respect to said outer peripheral surface of said drum, and, as a tightening force is applied increasingly to the apply side end portion, the twining angle gradually increases and said anchor side end portion gradually deforms inwardly toward said drum.

21. A brake band according to claim 20, wherein said anchor side end portion includes an anchor pin.

22. A brake band according to claim 19, wherein said anchor side end portion includes an anchor pin.

23. A brake band according to claim 19, wherein, as the tightening force is applied increasingly to said apply side end portion, a maximum distance of said gap is reduced.

24. A brake band mounted on a drum, said brake band comprising:

a strap having opposite end portions and twined around an outer peripheral surface of said drum;

an apply side end portion provided on one end portion of said strap; and an anchor side end portion provided on the other end portion of said strap, wherein, in an initial state of the brake band with no tightening force applied to the drum, a portion of said strap contacts said outer peripheral surface of said drum to define an initial twining angle and said anchor side end portion of said brake band is disposed so as to have a predetermined gap with respect to said outer peripheral surface of said drum, and, as a tightening force is applied increasingly to the apply side end portion, the twining angle gradually increases and said anchor side end portion gradually deforms inwardly toward said drum.

25. A brake band according to claim 24, wherein said apply side end portion is also disposed so as to have a predetermined gap with respect to said outer peripheral surface of said drum when no tightening force is applied to said apply side end portion.

26. A brake band according to claim 25, wherein brackets are provided on said apply side end portion and said anchor side end portion, respectively, an apply pin abuts against the bracket on said apply side end portion, and an anchor pin is fixed to the bracket on said anchor side end portion.

27. A brake band according to claim 24, wherein brackets are provided on said apply side end portion and said anchor side end portion, respectively, an apply pin abuts against the bracket on said apply side end portion, and an anchor pin is fixed to the bracket on said anchor side end portion.

28. A brake band according to claim 24, wherein said gap is gradually reduced as the tightening force is applied increasingly to the apply side end portion.

29. A brake band according to claim 24, wherein said gap decreases in size along said strap with increasing distance from said anchor side end portion.

30. A brake band according to claim 24, wherein said gap is not larger than 2 mm.

31. A brake band according to claim 24, wherein said anchor side end portion includes an anchor pin.

32. A brake band according to claim 24, wherein, as the tightening force is applied increasingly to said apply side end portion, a maximum distance of said gap is reduced.

33. A brake band according to claim 20, wherein, as the tightening force is applied increasingly to said apply side end portion, a maximum distance of said gap is reduced.

* * * * *